(12) United States Patent
Foran et al.

(10) Patent No.: US 12,485,662 B2
(45) Date of Patent: Dec. 2, 2025

(54) OPEN AREA CORE SANDWICH STRUCTURE MANUFACTURING TOOL

(71) Applicant: Teijin Automotive Technologies, Inc., Auburn Hills, MI (US)

(72) Inventors: Hugh Foran, Auburn Hills, MI (US); Matthew Plauman, Auburn Hills, MI (US); Evan Freeman-Gibb, Auburn Hills, MI (US); Shawn Hawes, Auburn Hills, MI (US)

(73) Assignee: CSP INNOVATIONS, INC., Auburn Hills, MI (US)

( * ) Notice: Subject to any disclaimer, the term of this patent is extended or adjusted under 35 U.S.C. 154(b) by 169 days.

(21) Appl. No.: 18/035,828

(22) PCT Filed: Nov. 10, 2021

(86) PCT No.: PCT/US2021/058725
§ 371 (c)(1),
(2) Date: May 13, 2023

(87) PCT Pub. No.: WO2022/103796
PCT Pub. Date: May 19, 2022

(65) Prior Publication Data
US 2023/0415466 A1 Dec. 28, 2023

Related U.S. Application Data

(60) Provisional application No. 63/113,244, filed on Nov. 13, 2020.

(51) Int. Cl.
*B32B 37/12* (2006.01)
*B29C 33/00* (2006.01)
(Continued)

(52) U.S. Cl.
CPC .......... *B32B 37/12* (2013.01); *B29C 33/0038* (2013.01); *B29C 65/02* (2013.01);
(Continued)

(58) Field of Classification Search
CPC ..... B32B 2255/04; B32B 37/10; B32B 37/12; B29C 66/8322; B29C 65/02; B29C 33/0038
See application file for complete search history.

(56) References Cited

U.S. PATENT DOCUMENTS 5,759,594 A 6/1998 Masui et al.
6,103,180 A 8/2000 Haeseker et al.
(Continued)

FOREIGN PATENT DOCUMENTS

EP 2229489 B1 7/2018
GB 1029633 A 5/1966
(Continued)

OTHER PUBLICATIONS

EESR issued in corresponding European Appln. No. 21892699.6, dated Oct. 24, 2024.
Int'l Search Report for PCT/US2021/058725, dated Mar. 4, 2022.

*Primary Examiner* — Vishal I Patel
(74) *Attorney, Agent, or Firm* — Quinn IP Law

(57) ABSTRACT

A tool for manufacturing a sandwich composite material component is provided that includes a lower tool having a surface configured to receive materials for forming the sandwich composite material component. An upper tool is also provided that has a sealing edge and a cutting edge. The upper tool and the lower tool are configured to be separated to an open position and to be brought together to a closed position, the upper tool and the lower tool define a cavity when in the closed position. A process for forming a sandwich composite material component is also provided.

11 Claims, 10 Drawing Sheets

(51) Int. Cl.
  *B29C 65/00*     (2006.01)
  *B29C 65/02*     (2006.01)
  *B32B 37/10*     (2006.01)

(52) U.S. Cl.
  CPC .......... *B29C 66/8322* (2013.01); *B32B 37/10* (2013.01); *B32B 2255/04* (2013.01)

(56) References Cited

U.S. PATENT DOCUMENTS

| | | | |
|---|---|---|---|
| 2003/0170460 A1* | 9/2003 | Sienkiewicz | B29C 51/14 264/510 |
| 2004/0123941 A1 | 7/2004 | Spain et al. | |
| 2010/0295329 A1* | 11/2010 | Sapak | B29C 67/0044 425/408 |
| 2013/0224448 A1 | 8/2013 | Igarashi et al. | |

FOREIGN PATENT DOCUMENTS

| | | | | |
|---|---|---|---|---|
| WO | WO-2009070756 A2 * | 6/2009 | ............ | B29C 51/32 |
| WO | 2020117717 A1 | 6/2020 | | |

* cited by examiner

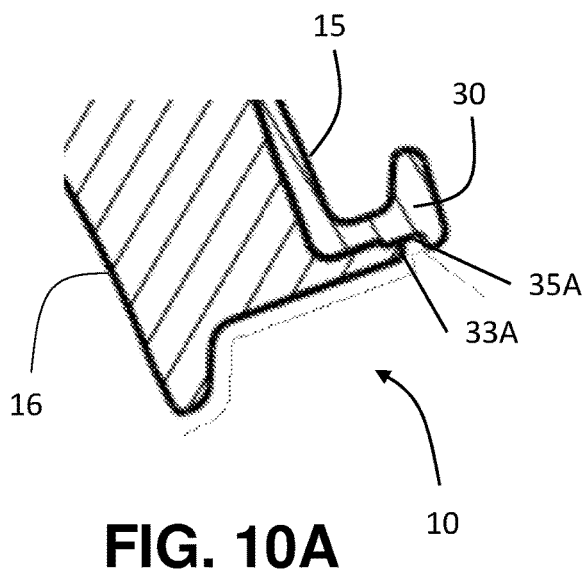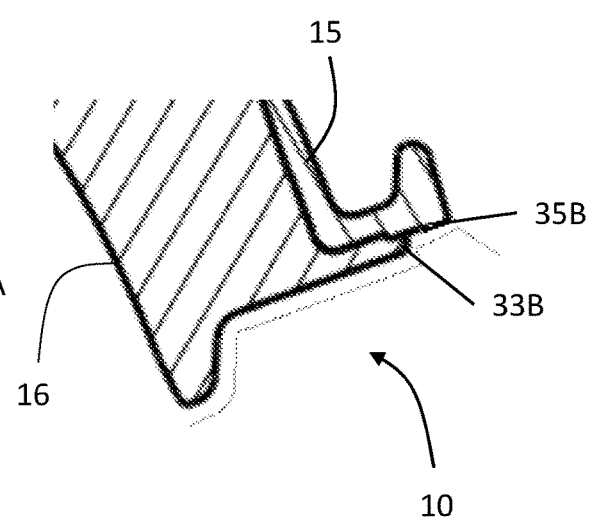
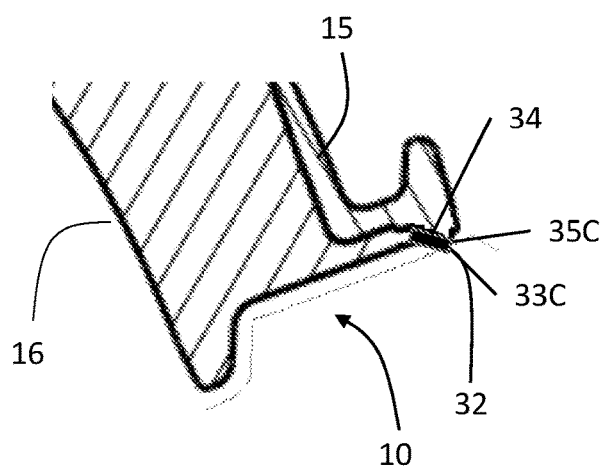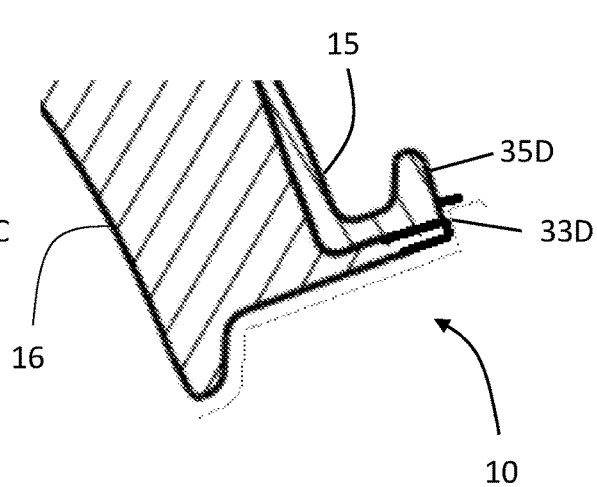

OPEN AREA CORE SANDWICH STRUCTURE MANUFACTURING TOOL

RELATED APPLICATIONS

This application claims priority benefit of U.S. Provisional Application Ser. No. 63/113,244 filed 13 Nov. 2020; the contents of which are hereby incorporated by reference.

FIELD OF THE INVENTION

The present invention in general relates to manufacturing of composites and in particular to manufacturing of a composite sandwich structure assembly with an intervening open area core support matrix and surface sheets surrounding the open area core to provide at least one surface that meet vehicle exterior surface gloss standards.

BACKGROUND OF THE INVENTION

Weight savings in the automotive, transportation, and logistics-based industries has been a major focus in order to make more fuel efficient vehicles both for ground and air transport. In order to achieve these weight savings, light weight composite materials have been introduced to take the place of metal structural and surface body components and panels. Composite materials are materials made from two or more constituent materials with significantly different physical or chemical properties, that when combined, produce a material with characteristics different from the individual components. The individual components remain separate and distinct within the finished structure. A composite material may be preferred for many reasons: common examples include materials which are stronger, lighter, or less expensive when compared to traditional materials. A sandwich-structured composite is a special class of composite material that is fabricated by attaching two thin but stiff skins to a lightweight but comparatively thick core. The core material is normally a low strength material, but its higher thickness provides the sandwich composite with high bending stiffness with overall low density.

While sandwich structures have previously been developed to provide strength and reduced weight, the ability to obtain a vehicle exterior quality high gloss surface has remained a challenge, regardless of whether the surface outermost layer is thermoset resin or thermoplastic. Exemplary of these efforts are U.S. Pat. Nos. 5,087,500A; 4,803,108A; 8,091,286B2; 4,369,608A; 3,553,054A; and WO2018/202473. It is conventional to either not use such structures in settings where vehicle high surface gloss is required, or resort to an additional outer layer to provide a high gloss outermost layer. Such outermost layers can be applied after structure production or through in mold coatings, both of which add to the cost and complexity of production.

Still another problem conventional to the art is that structure edges are ineffective and allow for infiltration of humidity or moisture that becomes entrained within the core and often inconsistent with finished vehicle surface requirements. With temperature extremes this entrained moisture can reduce the operational lifetime of the structure, while increasing the weight thereof. These problems of moisture infiltration are particularly pronounced in instances when the core is formed of cellulosic materials such as paper. Typically, attempts to seal the edges of such sandwich composite materials require additional processing steps to form the material, seal the edges, and trim any excess material. These additional processing steps often must be done by hand by highly skilled craftsman or by multiple expensive manufacturing tools. These additional processing steps thus require a great deal of time, making manufacture of such composite materials too slow and too costly for mass manufacturing.

Still another problem conventional to the art is that it is often difficult to attach components to such sandwich structures given the make up of the core, and particularly when at least one surface of the composite is intended to have a high-gloss Class-A surface finish. The inability to attach additional components to such sandwich composites significantly limits the utility of such composites to only a few applications.

Thus, there exists a need for a tool for manufacturing a sandwich composite structure that affords a high gloss surface with moisture resistance and well-trimmed edges without resort to additional processing after production. There also exists a need for such sandwich composite structures to be manufactured such that they are ready to receive additional attachments.

SUMMARY OF THE INVENTION

A tool for manufacturing a sandwich composite material component is provided that includes a lower tool having a surface configured to receive materials for forming the sandwich composite material component. An upper tool is also provided that has a sealing edge and a cutting edge. The upper tool and the lower tool are configured to be separated to an open position and to be brought together to a closed position, the upper tool and the lower tool define a cavity when in the closed position.

A process for forming a sandwich composite material component includes positioning a high gloss surface sheet on a lower tool. A first face of an open area core is joined to the high gloss surface sheet with a first adhesive layer intermediate therebetween. A structural skin is joined to a second face opposing the first face of the open area core with a second adhesive layer intermediate therebetween to form a material stack. An upper tool is brought into contact with the material stack such that a sealing edge of the upper tool engages with the material stack to seal at least one edge of the material stack to join the high gloss surface sheet and the structural skin together at the at least one edge to form a moisture resistant seal. The upper tool is brought into further contact with the material stack such that a cutting edge of the upper tool engages the material stack to trim excess material from the material stack proximal to the at least one edge.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 10A-10D are cross-sectional views of edges according to the present invention.

DESCRIPTION OF THE INVENTION

Figure 1:
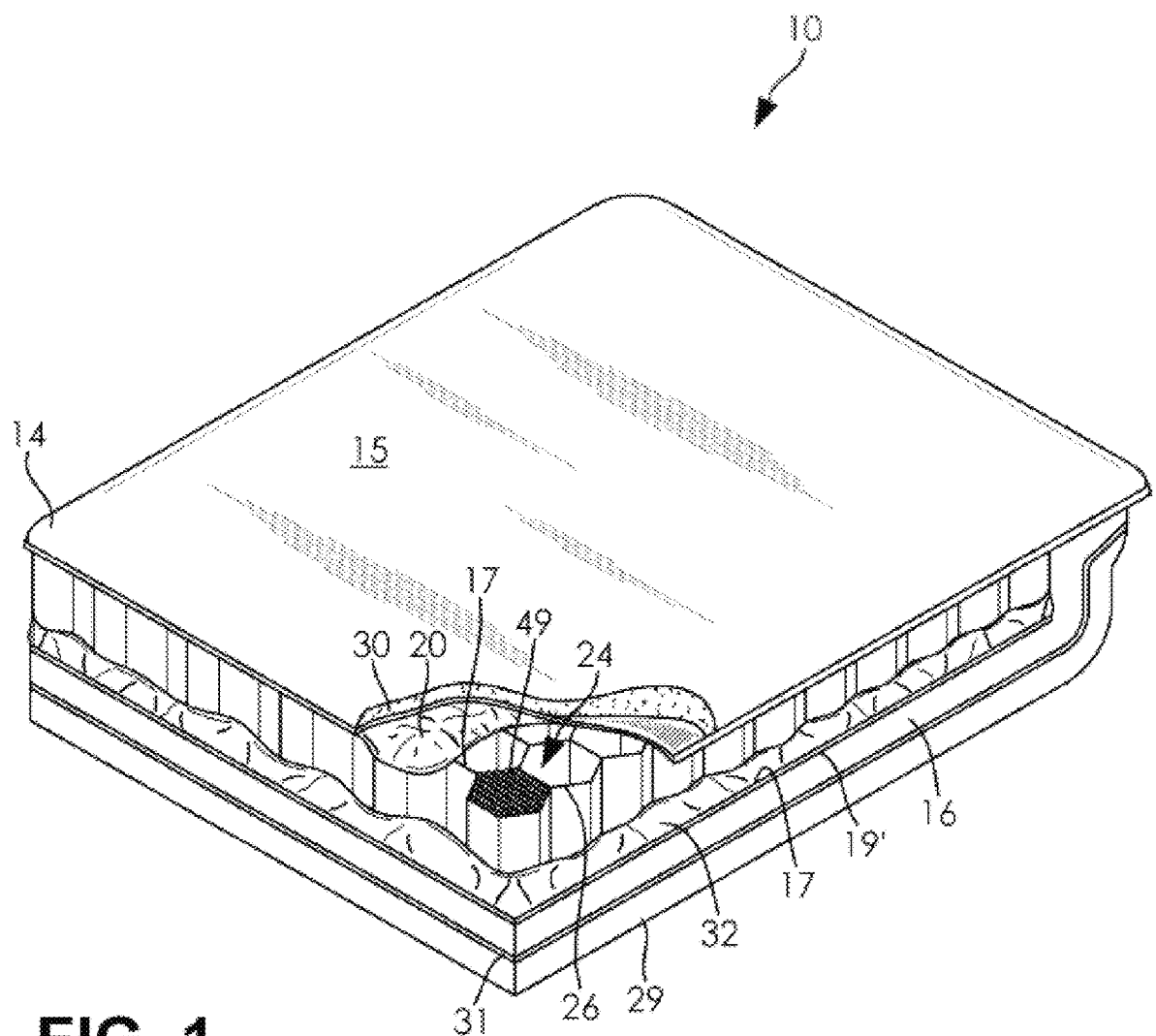
FIG. 1 is a partial cutaway, perspective view of a composite sandwich component formed according to embodiments of the present invention.

The present invention has utility as a tool for manufacturing a sandwich composite structure that affords a high gloss surface with moisture resistance and well-trimmed edges without resort to additional processing after production. The present invention also has utility as a tool for manufacturing a sandwich composite structure that is ready to receive additional attachments. According to embodiments, the inventive tool is configured to form a composite sandwich panel structure with an open area core sandwiched between a high gloss surface sheet and a structural skin with a sealed edge that is watertight and waterproof to prevent infiltration of humidity or moisture to the open area core.

According to embodiments, the inventive manufacturing tool forms sandwich composite structures wherein the high gloss surface sheet and structural skin are adhered to the open area core with an adhesive or glue that is viscous when applied. The viscosity of the adhesive as applied allows for contact with the interior volume of the open area core to create more adhesion surface area yet without excessively running into the pores defined in the open area core before the adhesive cured or hardens thereby providing greater adhered contact area between the components of the sandwich composite structure. As a result, the inventive manufacturing tool produces sandwich composite structures with reduced delamination of the components of the sandwich composite structure and without bond line readthrough into the high gloss surface sheet. It is appreciated that the inventive manufacturing tools provides a high gloss exterior surface without resort to an additional outermost layer by balancing of opposing surface tension properties of the composite sandwich panel structures to avoid a loss in tolerances associated with bowing of the structure. In some embodiments of the present invention, a cloth is positioned intermediate between the open area core and at least one of the high gloss surface sheet or the structural skin. The inventive manufacturing tool additionally provides watertight and waterproof composite sandwich panel structures in a single manufacturing tool and processing step. That is, the inventive tool is configured to shape, seal, and trim the sandwich composite in a single processing step, thus increasing manufacturing throughput and enabling mass production of such sandwich composites. Furthermore, the inventive tool is configured to produce sandwich composites that are capable to having additional components such as locks, latches, handles, and structural components attached thereto by creating hardpoints within the sandwich composites produced by the inventive tool.

The present invention is suitable for manufacturing all vehicle components made of composite material, but in particular for vehicle body shell components, such as vehicle roof modules, roof posts, A, B, C or D pillars of vehicles, vehicle doors, wings, engine compartment covers, luggage compartment covers, rear-end modules, roof shells of cabriolet hoods, front or rear spoilers. Embodiments of the inventive manufacturing tool further provide sound dampening and temperature variation resistance qualities to sandwich composite materials.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, the term "high gloss surface" refers to a surface having minimal perceptible surface defects when visually inspected for about three seconds from about 24-28 inches from the viewer and normal to the part surface+/−90 degrees in a well-lit area. That is, the term "high gloss surface" refers to a surface capable of being painted and accepted as a "Class A" autobody part. This is commonly measured by ASTM D523. In the automotive industry, a Class A surface is a surface a consumer can see without functioning the vehicle (e.g., opening the hood or decklid), while a Class A surface finish generally refers to painted outer panels and specifically to the distinctness of image (DOI) and gloss level on the part. It is appreciated that a surface layer may be subjected to sanding, trimming, and priming prior to receiving a paint coating that imparts high gloss, yet must retain dimensionality and adhesion uniformity to primer and paint so as to achieve a high gloss finish.

Figure 2:
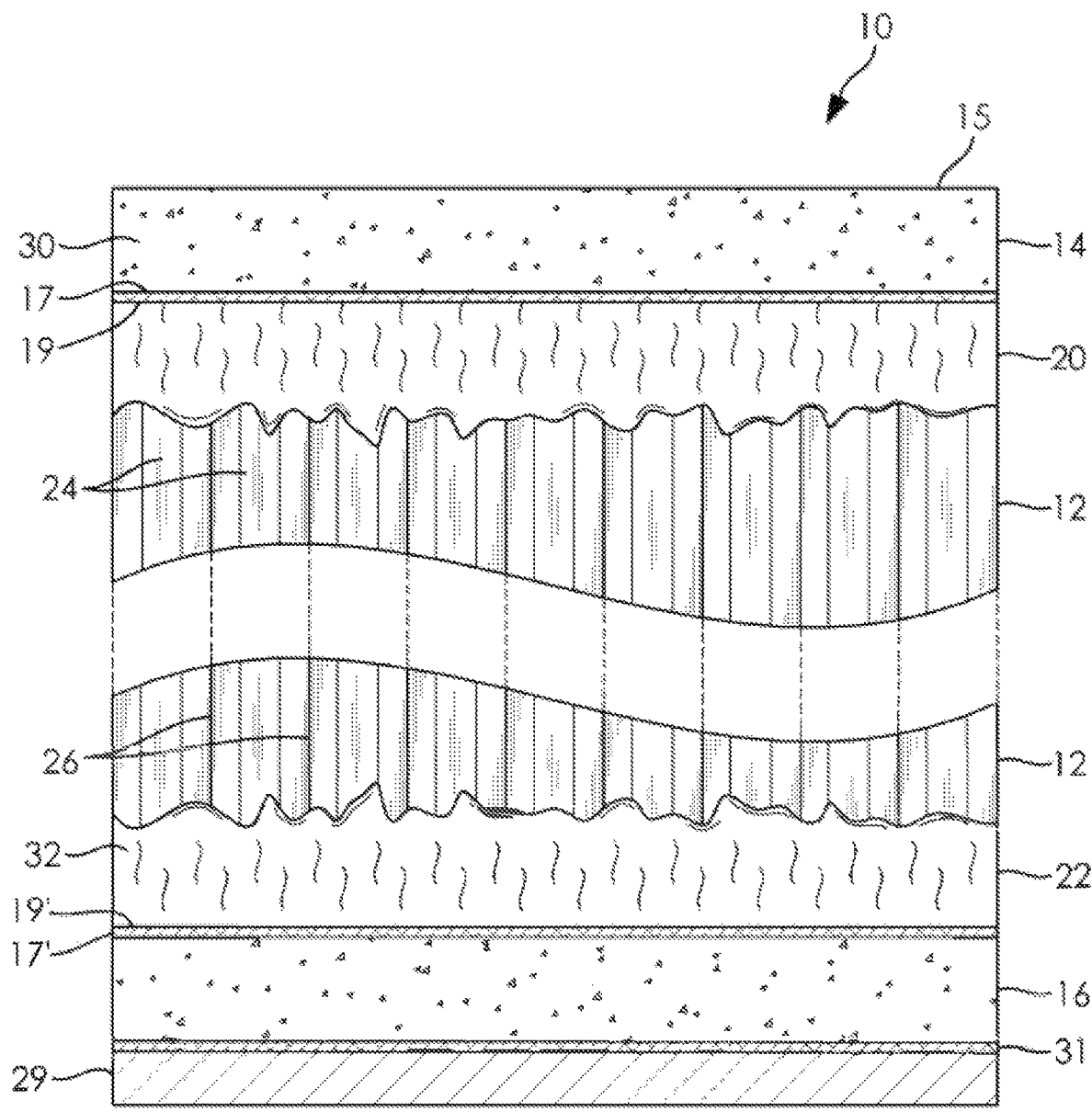
FIG. 2 is an enlarged partial cutaway, side view of a composite sandwich assembly of FIG. 1 along a line bisecting the hexagonal pores.

Referring now to the figures, a composite sandwich structure formed by the inventive manufacturing tool 100 is shown generally at 10. The sandwich 10 has an open area core 12 with walls 26 defining an ordered array of pores 24 terminating in faces 17 and 17'. The open area core 12 is positioned between a high gloss surface sheet 14 on one side and a structural skin 16 on an opposite side therefrom. As shown in FIG. 1, a portion of the high gloss surface sheet 14 is cutaway to reveal the adhesive 20, a cloth, if present; and the open area core 12. The high gloss surface sheet 14 may be adhered to a first side of the open area core 12 by a first adhesive layer 20 and presents an outwardly facing high gloss surface 15. FIG. 2 is an enlarged cross-sectional view of a composite sandwich 10 formed by embodiments of the inventive manufacturing tool 100 showing further details of the various layers making up the composite sandwich. A cloth 19 may be present intermediate between the face 17 of the open area core 12 and the high gloss surface sheet 14, the cloth 19 embedded within the adhesive 20. The structural skin 16 may be adhered to an opposing second side of the open area core 12 by a second adhesive layer 22. In some inventive embodiments, a cloth 19' is placed intermediate between the face 17' of open area core 12 and the structural skin 16, the cloth 19' embedded within the adhesive 22. While the structure 10 depicted in FIGS. 1 and 2 is planar, it is appreciated that both the high gloss surface and the structure surface are each independently formed with non-planar contours.

Figure 3:
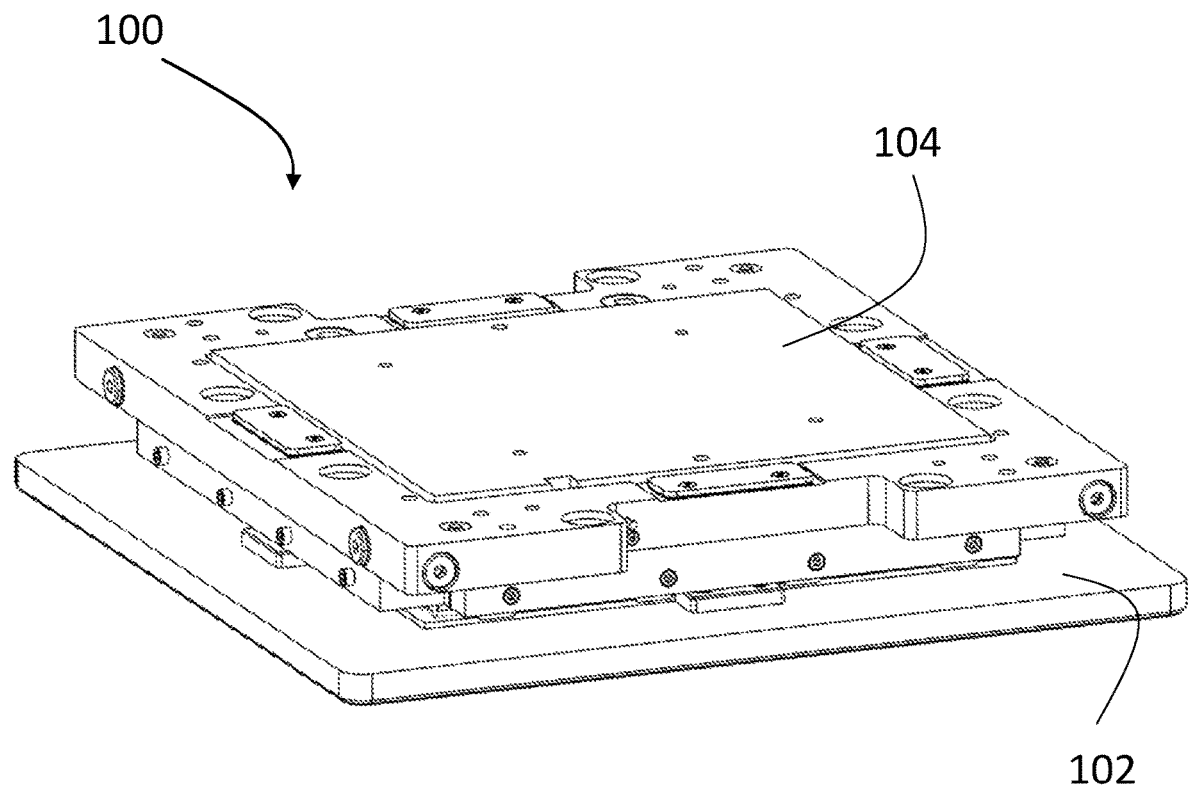
FIG. 3 is a perspective view of an inventive tool according to embodiments of the present disclosure for manufacturing a composite sandwich component, with the tool in a closed position.

As shown in FIG. 3, embodiments of the inventive manufacturing tool 100 include a lower tool 102 and an upper tool 104. The upper tool 104 and the lower tool 102 are configured to be separated to an open position and to be brought together to a closed position, as shown in FIG. 3. In the closed position, the upper tool 104 and the lower tool 102 define a mold cavity 106 that is configured to impart a shape to a resulting composite sandwich material 10 formed therein. According to embodiments, the lower tool 102 includes a planar surface 108 that is configured to receive the materials that make up what will be formed into the composite sandwich 10. It will be understood that the materials that make up the composite sandwich 10 may be placed individually onto the lower tool 102 to form a stack on the lower tool 102 or may be placed as a pre-stacked unit onto the lower tool 102.

Figure 4:
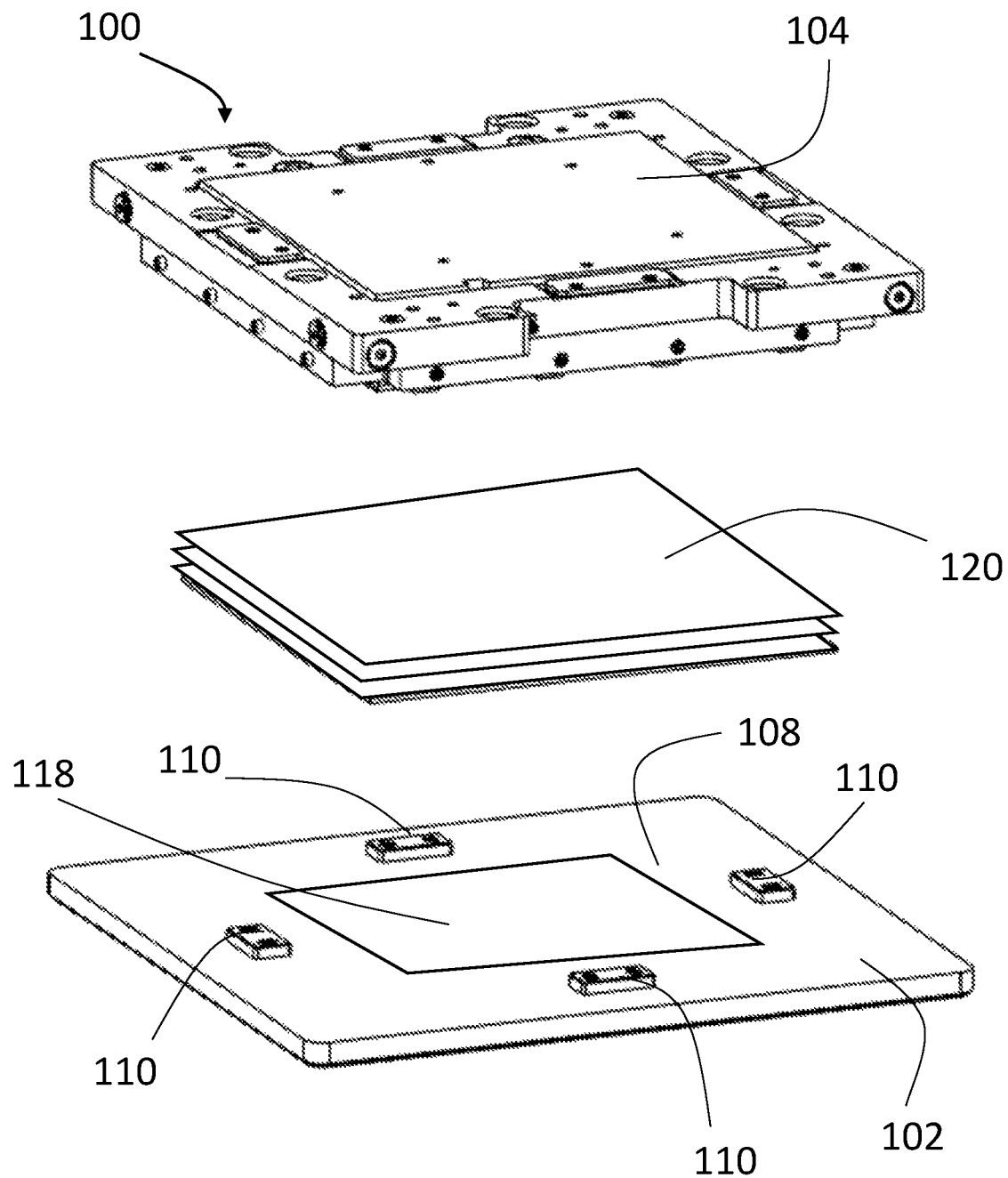
FIG. 4 is a perspective exploded view of an inventive tool according to embodiments of the present disclosure for manufacturing a composite sandwich component, with a stack of material positioned between upper and lower portions of the tool.

According to embodiments, such as that shown in FIG. 4, the lower tool 102 includes a locator 110 that is configured to aid in positioning of the materials placed onto the planar surface 108 of the lower tool 102. According to embodiments, the locator 110 may be a continuous ridge that encircles the planar surface 108 or may be a single or a plurality of discrete ridges or pegs that extend from the lower tool 102 to identify the bounds of the molding area of the lower tool 102. The locator 110 ensures that the materials of the sandwich composite are easily and correctly positioned within the bounds of the molding area of the lower tool 102.

According to embodiments, the upper tool 104 includes a shaped form 112 internal to the cavity 106 defined by the upper tool 104 and the lower tool 102. The shaped form 112 is configured to imparts its shape to the stack of composite materials when it is brought into contact with the materials. The upper tool 104 additionally includes a sealing edge 114 that is configured to contact the materials of the composite sandwich to seal the edges thereof, thereby forming a watertight seal. Additionally, the upper tool 104 includes a cutting edge 116 that is configured to contact the materials of the composite sandwich to cut off any excess material.

Additional components and features of the inventive manufacturing tool 100 will now be described with reference to the inventive tool 100 as used in an inventive process for forming a sandwich composite panel 10. As noted above, the materials that make up the composite sandwich 10 may be placed individually onto the lower tool 102 to form a stack on the lower tool 102 or may be placed as a pre-stacked unit onto the lower tool 102. The process described herein explains the process of placing the materials individually within the tool 100 to build a stack of material therein. However, the features and materials described are the same as those when the materials are pre-stacked outside of the inventive tool 100 and then placed in the tool 100 as a pre-stacked unit. In fact, for the sake of clarity, FIG. 4 shows the materials as a pre-stacked unit 120.

According to embodiments, the inventive tool 100 is placed in the open position with the upper tool 104 removed from the lower tool 102. A high gloss surface sheet 14 is positioned in the inventive tool 100. According to embodiments, the high gloss surface sheet 14 is positioned on the lower tool 102 and is aligned into a desired position by the locator 110. According to embodiments, the high gloss surface sheet 14 is positioned with the exterior high gloss surface being in contact with the planar surface 108 of the lower tool 102. According to embodiments, in order to protect the surface finish of the high gloss surface sheet 14, the planar surface 108 of the lower tool 102 includes a protective barrier 118 that is not abrasive or damaging to the surface finish of the high gloss surface sheet 14, such as a foam or felt layer.

A high gloss surface sheet used with the present invention is shown for example with respect to reference numeral 14. The high gloss surface sheet 14 may be formed from sheet molding compound (SMC), thermoplastic, dicyclopentadiene (DCPD), overmolded polyurethane (PU), or a combination thereof. The high gloss surface sheet 14 may include a filler material 30 to reinforce and/or serve to decrease the weight of the high gloss surface sheet 14. The filler material 30 is any of glass fibers, carbon fibers, natural fibers, hollow or solid glass microspheres, or a combination thereof. The fibers may be oriented or non-oriented. In some inventive embodiments in which SMC forms the high gloss surface, a resin package sold by Continental Structural Plastics, Inc. under the tradenames TCA® and TCA® ULTRA-LITE™ are used herein. Exemplary formulations of which are detailed in U.S. Pat. No. 7,700,670; WO2017/184761; and U.S. Pat. No. 7,524,547B2. It is appreciated that the high gloss sheet routinely includes additives to retain dimensionality. Such additives routinely including glass fiber; carbon fiber; inorganic particulate fillers such as calcium carbonate, talc, and carbon black; glass microspheres; carbon nanotubes; graphene; low profile additives; moisture scavengers; and combinations thereof. Typical thicknesses of the high gloss surface sheet in the present invention range from 0.5 to 5 millimeters (mm) without regard to edges.

In some inventive embodiments, a first adhesive layer 20 is applied to the reverse side of the high gloss surface sheet 14 relative to the high gloss surface 15. Applying the first adhesive layer 20 on to the reverse side of the high gloss surface 14 is accomplished by spraying or painting an adhesive onto the first side of the high gloss surface sheet 14. According to embodiments, the adhesive layer 20 is applied using an applicator 122 of the inventive tool 100, such as that shown in FIG. 5. According to embodiments, the first adhesive layer 20 is formed of either a thermoplastic or curable formulation. According to certain inventive embodiments, the first adhesive layer 20 is a polyurethane or polyurethane prepolymer adhesive, which may be in the form of glue, a moisture cure adhesive, a reactive hot melt adhesive, or a polyurethane resin.

Next, according to embodiments, a cloth 19 is embedded within the first adhesive layer 20. The cloth can be woven or nonwoven yet having sufficient porosity to allow the adhesive layer 20 to penetrate therethrough. A cloth 19 operative herein illustratively includes fibers of thermoplastic materials such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; carbon fibers; polyaramids; glass fibers in the form as a woven, roving, or lofted sheet; and mixtures of the various fibers. The cloth 19 has a mesh size of 10 to 1000, that is, the mesh layer has 10 to 1000 opening per square inch. The cloth 19 tends to reduce the effects of the walls 26 on the outward appearance of the high gloss surface sheet 14.

According to embodiments, the process continues by placing an open area core 12 onto the reverse side of the high gloss surface sheet 14, with the first adhesive layer 20 positioned there between. An open area core 12 for use with the inventive tool 100 is formed of a lightweight material that defines a plurality of pores 24 so as to reduce the overall density of the open area core 12. An open area core for use with the present invention is formed from a variety of materials that include cellulosics such as corrugated fiberboard, paper board, paper stock; thermoplastics such as poly(methyl methacrylate) (PMMA), acrylonitrile butadiene styrene (ABS), polyamides, polylactides, polybenzimidazoles, polycarbonates, polyether sulfones, polyethylene, polypropylene, polystyrene, polyvinyl chloride, and block copolymers of any one of the aforementioned where at least one of the aforementioned makes up the majority by weight of the copolymer and regardless of the tacticity of the polymer or copolymer; thermosets such as polyesters, polyureas, polyurethanes, polyurea/polyurethanes, epoxies, vinyl esters; metal such as aluminum, magnesium, and alloys of any one of the aforementioned where at least one of the aforementioned metals constitutes the majority by weight of the alloy; a foam formed from polyurethane, polyethylene, ethylene vinyl acetate, polypropylene, polystyrene, polyvinyl chloride, oraerogels, regardless of whether the foam is open-celled or closed-celled.

FIGS. 9A-9F show in top view of the edges of walls 26 that define pores of the open area core 12 that may be used to create a sandwich composite. An open area core, such as 12 depicted with respect to FIGS. 1 and 2 may use a wall material 26 to define a plurality of pores 24 in shape s that illustratively include hexagonal (FIG. 9A), circular (FIG. 9B), rhomboidal (FIG. 9C), triangular (FIG. 9D), parallelogram quadrilateral (FIG. 9E), and regular quadrilateral (FIG. 9F). of honeycombs, diamonds, squares, triangles, parallelograms, circles, or a combination thereof. The faces 17 and 17' of the open area core 12 support the tensioned high gloss surface sheet 14 and structural skin 16 when the composite sandwich is assembled and transfer externally applied forces within the structure 10. It is appreciated that while pores are depicted as isolated from one another that wall structures are readily formed from extended folded strips that define a portion of several pores and when made contiguous with other such folded strips define an array of pores that are intercommunicative along the lines of contact between contiguous strips.

According to some embodiments, the inventive manufacturing tool treats the walls 26 that define the pores 24 of the core 12 to modify a property thereof such as hydrophobicity or surface energy to promote adhesion thereto. By way of example, cellulosics are prone to moisture uptake and are readily coated with a wax such as a paraffin, or a silicone to render the cellulosic more hydrophobic compared to a native state. Alternatively, the cellulosic is readily alkylated by conventional reactions such as those with chloroacetic acid. Sarymsakov, A. A et al., Chem. Nat. Compd. (1997) 33: 337. Metals are similarly coated with a primer or other corrosion inhibitor. According to embodiments, such treatments are applied using an applicator 122 of the inventive manufacturing tool 100, such as that shown in FIG. 5. Alternatively, metals or polymers are plasma treated to modify surface energies to facilitate adhesion thereto.

According to certain embodiments, a sound and/or heat absorbing material is placed within the pores 24 of the open area core 12 to create a composite sandwich panel assembly that provides sound damping, fire retardancy, thermal insulation, or a combination thereof. According to embodiments, the pores 24 of the open area core 12 are at least partially filled with a fill 49. The fill illustratively including foam pellets, fire retardant, or a phase change material. Phase change materials operative herein include waxes or an inorganic salt hydrates. The fill 49 may be placed in the pores 24 of the open area core 12 after the core 12 is positioned in the inventive manufacturing tool 100 prior to or after application of a second cloth 19'. The fill 49 may be applied by hand or by an applicator 122 of the inventive manufacturing tool 100, such as that shown in FIG. 5.

Next, according to embodiments, a second cloth 19' is applied to the exposed end of the open area core 12, the cloth 19' having the attributes of the cloth 19 as detailed above. The cloth can be woven or nonwoven yet having sufficient porosity to allow a second adhesive layer 22 to penetrate therethrough. The cloth 19' providing not only a larger surface area for adhesive layer 22, but also the cloth is believed to function to mitigate surface tension differences relative to structural layer 16 associated with situations such as the manufacturing process, temperature differences in a use environment, and differential force loading during usage. In some inventive embodiments where both cloths 19 and 19' are present, the cloths 19 and 19' are formed of the same material. In still other embodiments, the cloths 19 and 19' are formed of the same material and have the same thickness. In still other embodiments, the cloths 19 and 19' are formed of the same material, have the thickness, and are adhered by the same adhesive.

According to embodiments, a second adhesive layer 22 is applied to the second cloth 19'. Applying the second adhesive layer 22 on to the second cloth 19' positioned on the face 17' of the open area core is accomplished by spraying or painting an adhesive onto the second cloth 19'. Thus, the second cloth 19' provides a surface upon with a second adhesive layer 22 may be applied without completely running down the walls 26 of the open area core 12, but instead remaining mostly near the face 17' of the open area core 12 for adhering the core 12 to the structural sheet 16. However, given that the cloth 19' is permeable, some of the second adhesive layer 22 penetrates the cloth 19', embedding the cloth 19' in the second adhesive layer 22. According to embodiments, the second adhesive layer 22 is applied using an applicator 122 of the inventive tool 100, such as that shown in FIG. 5. According to embodiments, the second adhesive layer 22 is formed of either a thermoplastic or curable formulation. According to certain inventive embodiments, the second adhesive layer 22 is a polyurethane or polyurethane prepolymer adhesive, which may be in the form of glue, a moisture cure adhesive, a reactive hot melt adhesive, or a polyurethane resin. According to embodiments, the first adhesive layer 20 and the second adhesive layer 22 include an adhesive that is highly viscous when in an uncured state.

Next, the structural skin 16 is adhered to the second side of the open area core 12 by the second adhesive layer 22. According to embodiments, the structural skin 16 is formed of any one of sheet molding compound (SMC), thermoplastic sheet, Dicyclopentadiene (DCPD), overmolded polyurethane (PU), or a glass fiber mat. According to embodiments, the second adhesive layer 22 may be applied onto the structural skin 16 before the structural skin 16 is positioned on the second side of the open area core 12. In some embodiments the SMC is also a high gloss surface as detailed about with respect to reference numeral 14. When the structural skin 16 is a fiber mat, the fiber mat is formed of glass fibers. The fiber mat forming the structural skin may include non-oriented, non-woven fibers, unidirectional, or woven fibers. The structural skin 16 is adhered to the second side of the open area core 12 by the second adhesive layer 22.

According to some inventive embodiments, a decorative layer 29 is attached to the exposed surface 31 of the structural skin 16. In some embodiments, the decorative layer 29 is a vehicle interior surface. A decorative layer 29 illustratively includes flocking, textile, carpet, leather, textured soft-touch plastic, thermoplastic film, or a combination thereof.

According to embodiments, the thickness of the open area core 12, the high gloss surface sheet 14, and the structural skin may vary based on design parameters and intended use of a finished component formed from a composite sandwich panel assembly 10 of the present disclosure. As noted above, the high gloss surface sheet 14 has a thickness of 0.5 to 3.5 mm. The ratio of the high gloss surface sheet 14 average thickness to the open area core 12 average thickness is 0.01-1:1, while the ratio of the structural skin 16 thickness to the open area core 12 thickness is 0.05-1:1. According to embodiments, the high gloss surface sheet 14 has an average thickness of 1.5 to 5 mm and the open area core 12 has an average pore diameter of 6 to 25 mm. In some embodiments, the open area core 12 pore diameter is as much as 42 mm. As used herein, pore diameter is defined as the average of orthogonal pore dimensions measure at a right angle to the pore axis at the interior wall edge at the face 17. By way of example, a circular pore has identical diameter in x- and y-directions relative to the pore axis.

As will be understood by a person having ordinary skill in the art, the high gloss surface sheet tends to be a comparatively dense component and an expensive portion to manufacture given the materials used and necessary forming processes to maintain minimal perceptible surface defects suitable for a Class A autobody part. To reduce costs and weight of the inventive composite sandwich panel assembly 10, it is accordingly desirable to reduce the thickness of the high gloss surface sheet 14, making it as thin as possible. It will also be understood that as the thickness of the high gloss surface sheet 14 is decreased the high gloss surface sheet 14 tends to deform when supported by limited portions of the face 17 above the open area core 12. While result to a large contact surface area of the first adhesive layer 20 is advantageous, in some inventive embodiments a cloth 19 is embedded in the first adhesive layer 20.

Figure 5:
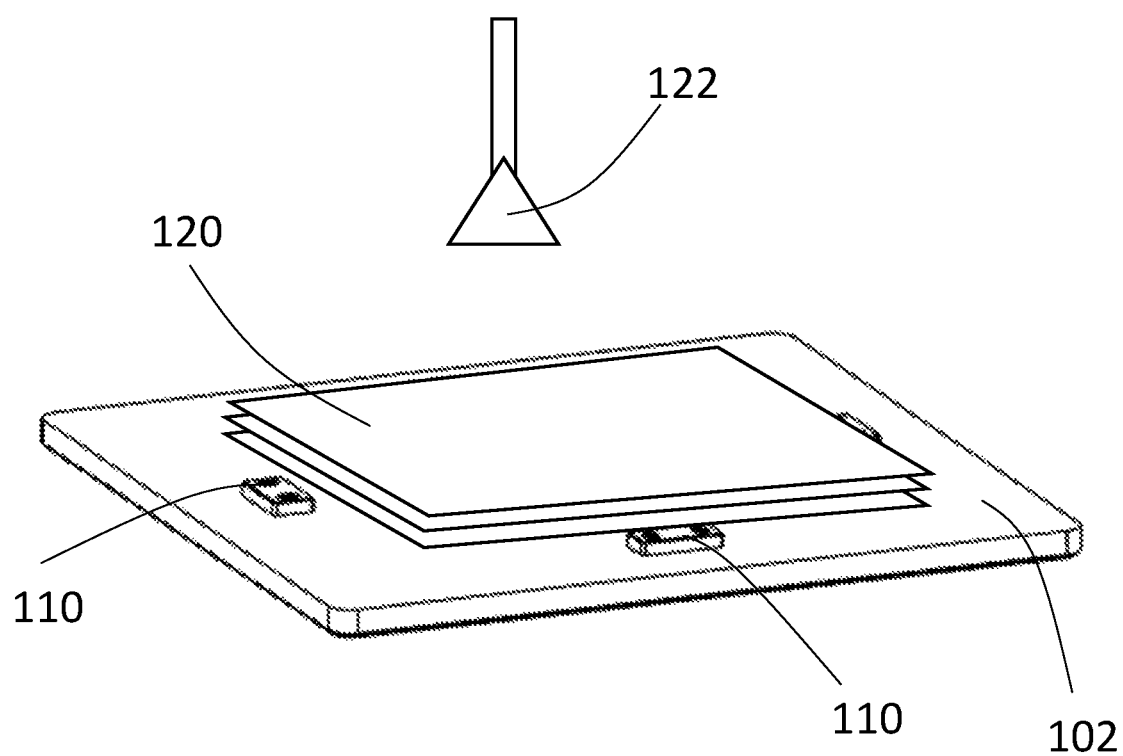
FIG. 5 is a perspective view of a lower tool according to embodiments in a process for forming a composite sandwich component.
Figures 6A, 6B:
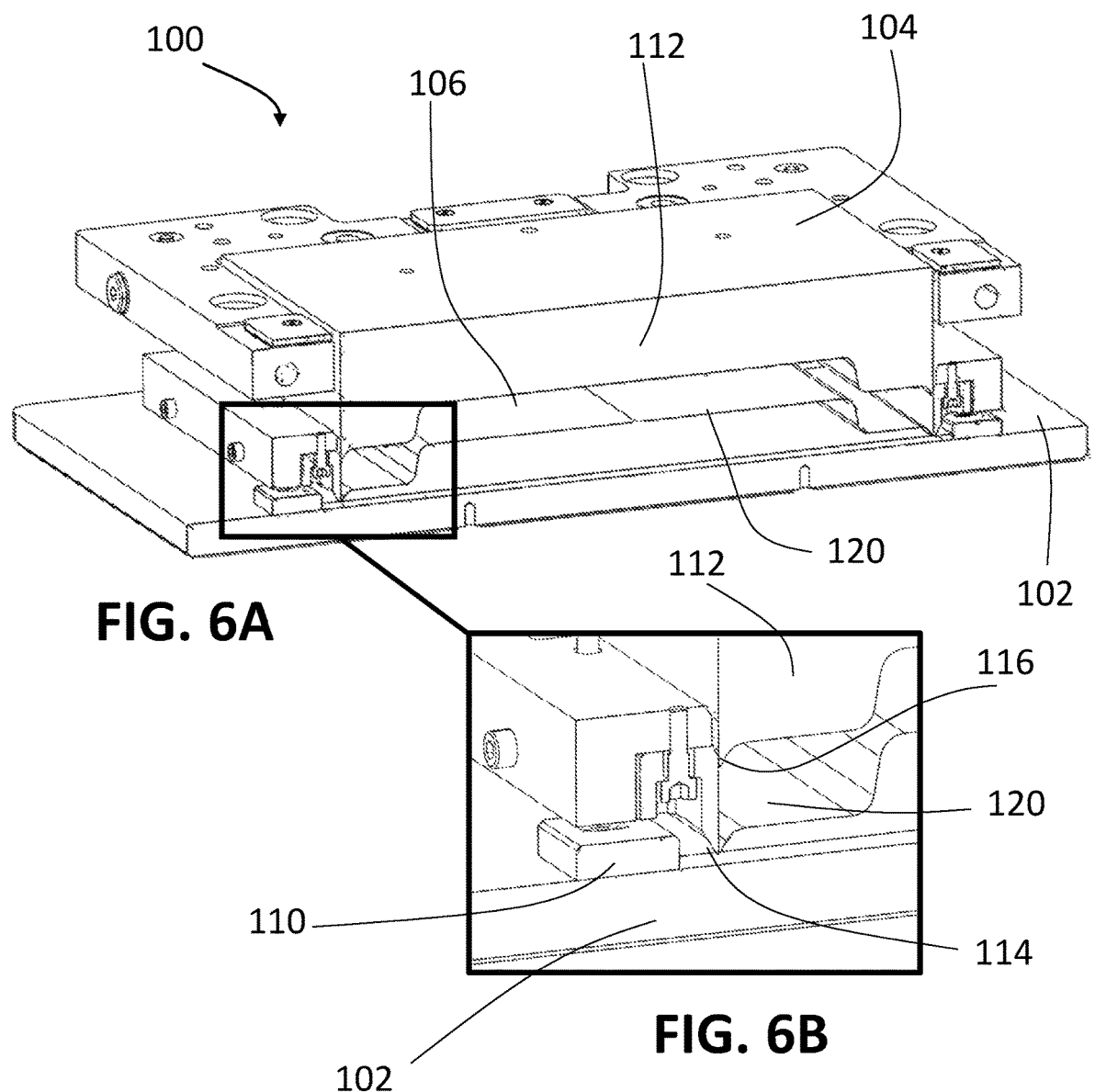
FIG. 6A is a perspective cross-sectional view of the tool of FIG. 3 in a process for forming a composite sandwich component according to embodiments of the present disclosure.
FIG. 6B is a detailed view of the indicated portion of FIG. 6A.
Figure 7A:
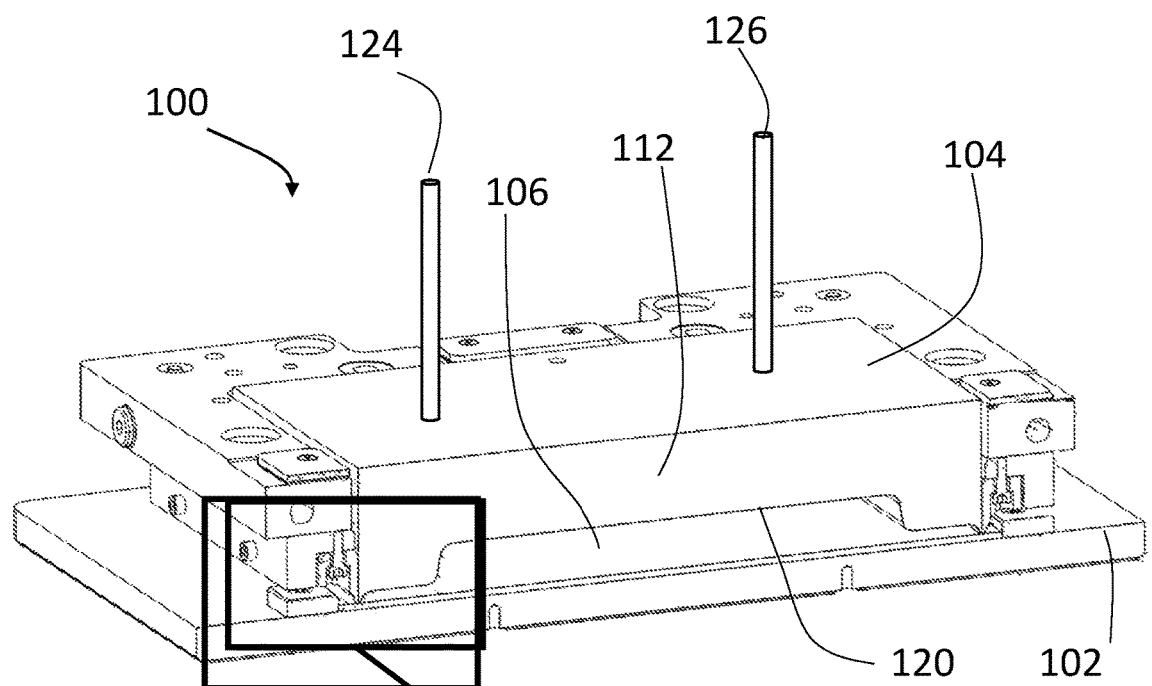
FIG. 7A is a perspective cross-sectional view of the tool of FIG. 3 in a process for forming a composite sandwich component according to embodiments of the present disclosure.
Figure 7B:
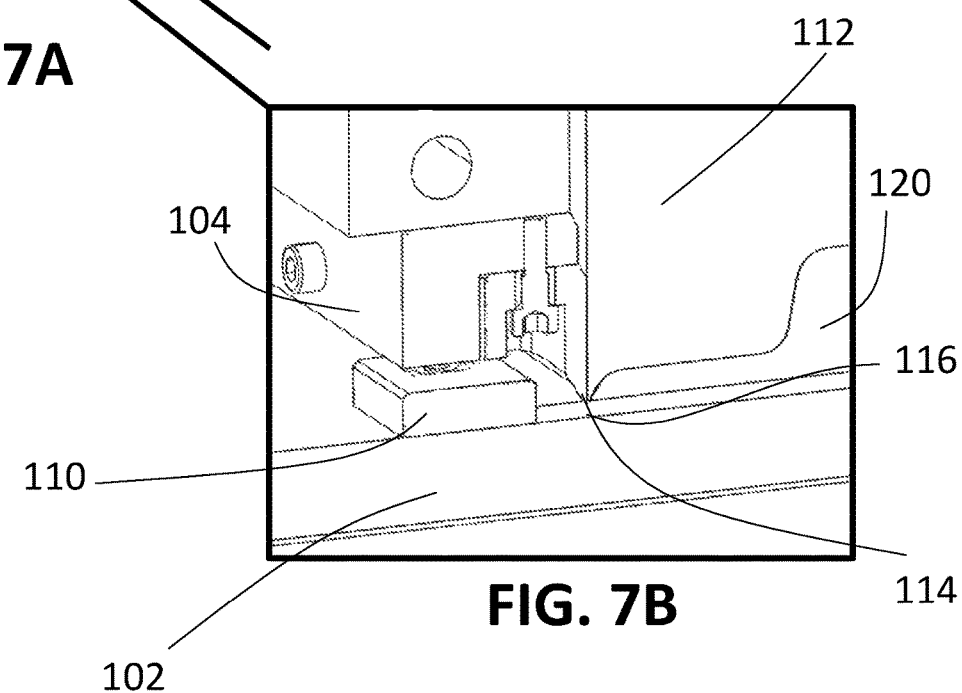
FIG. 7B is a detailed view of the indicated portion of FIG. 7A.

Once the stack of material 120 has been formed or placed in the lower tool 102 of the inventive manufacturing tool 100, as shown in FIG. 5, the upper tool 104 is moved from its open position to its closed position. As shown in FIGS. 6A and 6B, as the upper tool 104 is closed, the sealing edge 114 contacts the stack of material 120 to bring the edges of the structural skin 16 and the high gloss surface sheet 14 together along at least one edge of the stack of material 120 to form a seal along the edge. According to embodiments, at least one of the high gloss surface sheets 14 and the structural skin 16 is preformed such that it has edges extending generally perpendicularly from the plane of the sheet material, this edge providing sufficient material such that the edges of the high gloss surface sheet 14 and the structural skin 16 can be joined together. As shown in FIGS. 7A and 7B, as the upper tool 104 continues to move to its closed position, the cutting edge 116 of the upper tool 104 contacts the stack of material 120 to cut off any excess material. Thus, in a single closing motion of the upper tool 104 The high gloss surface sheet 14 and the structural skin 16 are joined together along an edge 33A-33D of the composite sandwich panel assembly to form a seal, as shown in FIGS. respectively, and any excess material is trimmed from the stack of material 120 to result in a fully formed, sealed, and trimmed sandwich composite material 10.

In certain inventive embodiments in which all of the edges of the composite sandwich panel assembly 10 are sealed, the open area core 12 is fully enclosed and moisture is inhibited from entering the interior of the composite sandwich panel assembly 10. In some situations, depending on the intended use and location of a part formed of the composite sandwich panel assembly 10, preventing moisture from entering the interior of the composite sandwich panel assembly 10 is important given that freeze thaw cycles of moisture within the part cause expansion and potentially failure of the assembly 10. Additionally, in embodiments in which the open area core 12 is formed of a hydrophilic material such as paper, moisture within the composite sandwich panel assembly 10 would destroy the open are core 12 and cause the part to fail.

FIGS. 10A-10D show various embodiments of ways in which the high gloss surface sheet 14 and the structural skin 16 are joined together to form a sealed edge 33A-33D, respectively, using the inventive manufacturing tool 100 according to the present disclosure. In some inventive embodiments an elastomeric gasket 34 is disposed between the high gloss surface sheet 14 and the structural skin 16 at the 33C to make the edge 33C more water resistant. It is appreciated that a gasket is readily included in the other edge joinder 33A, 33B, and 33D. The gasket 35 enhances maintenance of the edge seal over a wider range of use conditions.

As will be understood by one having ordinary skill in the art, to form an edge seal between the high gloss surface sheet 14 and the structural skin 16, at least one of the high gloss surface sheet 14 and the structural skin 16 requires enough material to wrap around the edge of the composite sandwich 10. According to certain inventive embodiments, at least one of the high gloss surface sheet 14 and the structural skin 16 is provided in dimensions greater than the dimensions of the final composite part such that the material is able to wrap around the final edge composite sandwich 10. According to certain inventive embodiments, the at least one of the high gloss surface sheet 14 and the structural skin 16 is preformed such that it has edges extending generally perpendicularly from the plane of the sheet material.

As shown in FIG. 10A, excess material of the structural skin 16 has been trimmed from the composite sandwich assembly 10 by the cutting edge 116 that presses against the divot 35A that is formed by the high gloss surface sheet 14. In FIG. 10B, the edge 33B formed by removing excess material for tool engagement against a shoulder 35B of the high gloss surface sheet 14. In FIG. 10C, the edge 33C formed by removing excess material for tool engagement against a shoulder 35C of the high gloss surface sheet 14. Also, as shown in FIG. excess material of one or both the high gloss surface sheet 14 and the structural skin 16 are trimmed with tool pressure against shoulder 35D.

As the upper tool 104 is moved to the closed position, a compressive force is applied to the stack of material 120. As shown in FIG. 2, due to the compressive force applied to the adhesive layers 20, 22 are engineered to have an initial viscosity on contact with the face 17, 17' and the walls 26 so as partially fill the pores 24 of the open area core 12. It is appreciated that the viscosity upon application is a function of factors that include application temperature, pore dimensions at the face, and intrinsic adhesive viscosity. The viscosity of the adhesive layers 20, 22 ensures that the adhesive does not excessively run into the pores defined in the open area core before the adhesive attains final strength. Accordingly, the adhesive surface area for adhesion between a high gloss surface sheet and an open area core is at least 5% more than surface area of the walls at the face. In still other embodiments, the adhesive area is between 5 and 100 surface area percent of the face, and even 100 surface area percent in still other inventive embodiments. This increased surface area of adhesion reduces delamination of the components of the composite sandwich 10 and surprisingly allows for the use of thinner high gloss surface sheets that do not exhibit bond line read through. As a result of increasing the adhesive surface area coverage from 10 to 50 surface areas percent allows for the comparatively expensive high gloss surface sheet to be reduced in thickness from 1.5 mm to between 1.3 and 0.8 mm while still retaining high gloss through prevention of bond line read through.

According to embodiments, the upper tool 104 and/or the lower tool 102 apply heat to the stack of material 120 positioned therein. According to embodiments, the applied heat aids in curing the first adhesive layer 20 and said second adhesive layer 22. Additionally, the compressive force as well as the heating, if applied, allows the shaped form 112 of the upper tool 104 to impart its shape to the sandwich composite material 10.

According to embodiments, when the upper tool 104 and the lower tool 102 are in contact such that the tool 100 is in the closed position, a vacuum may be applied to the composite sandwich panel 10. The vacuum may be applied by pins 124 that are inserted through the structural sheet 16, as shown in FIG. 7A, so as not to interfere with the class A surface of the high gloss surface sheet 14. According to embodiments, a substance may be injected into the composite sandwich panel 10, for example into the pores 26 of the open are core 12 by a at least one injector 126, as shown in FIG. 7A. The injectors 126 may inject a substance such as $CO_2$ or other fire suppressant, a sealant for water resistance, of a solidifying polymer material such as silicone or thermoset material to create a hard point to which additional components may be attached to the composite sandwich panel 10.

Figure 8:
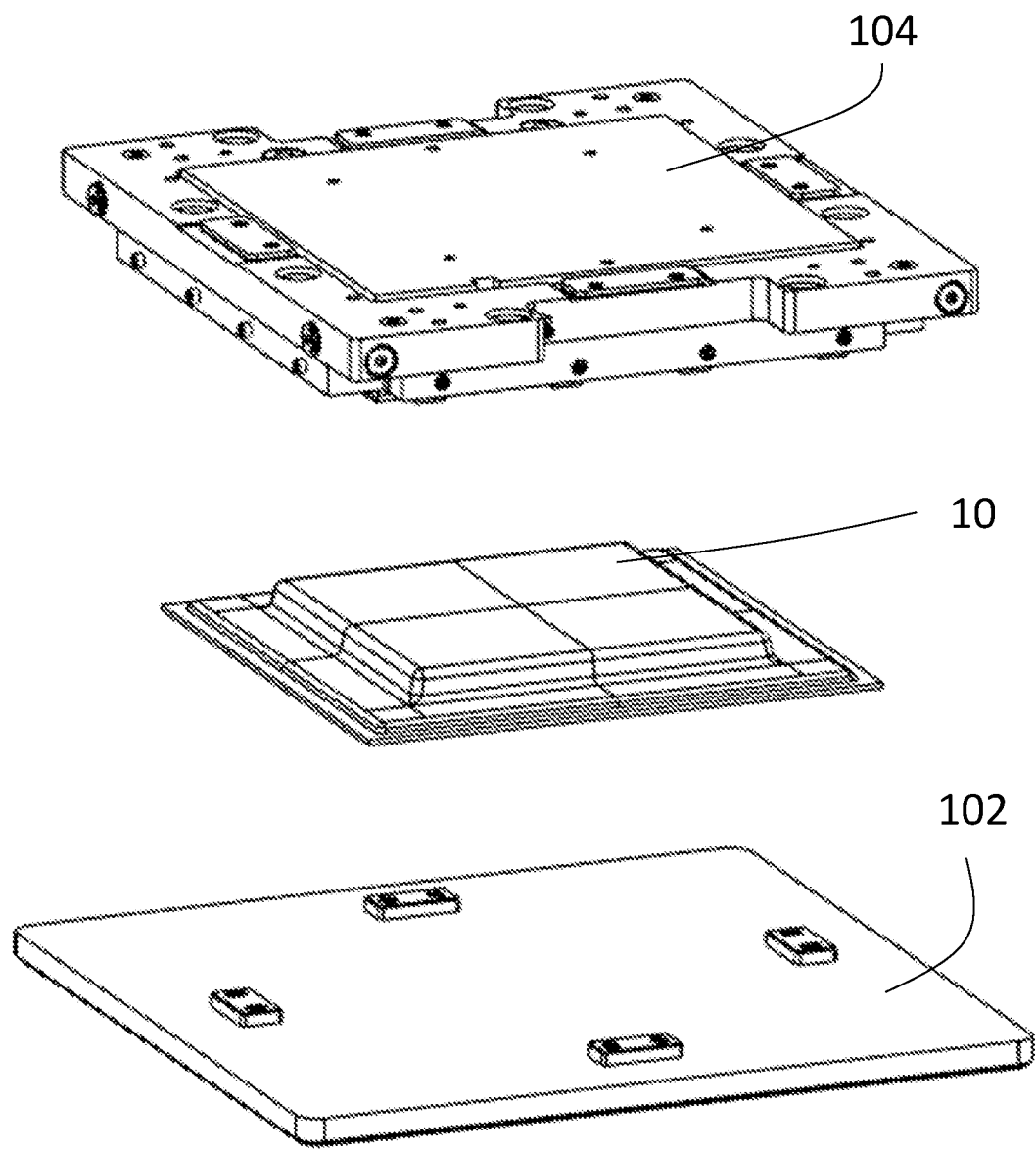
FIG. 8 is a perspective exploded view of an inventive tool according to embodiments of the present disclosure for manufacturing a composite sandwich component, with a completed composite sandwich component positioned between upper and lower portions of the tool.
Figure 9A:
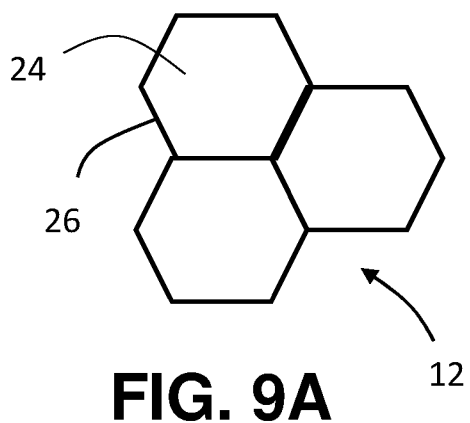
FIGS. 9A-9F are top views of various open pore structures operative in the present invention that include hexagonal (FIG. 9A), circular (FIG. 9B), rhomboidal (FIG. 9C), triangular (FIG. 9D), parallelogram quadrilateral (FIG. 9E), and regular quadrilateral (FIG. 9F)
Figure 9B:
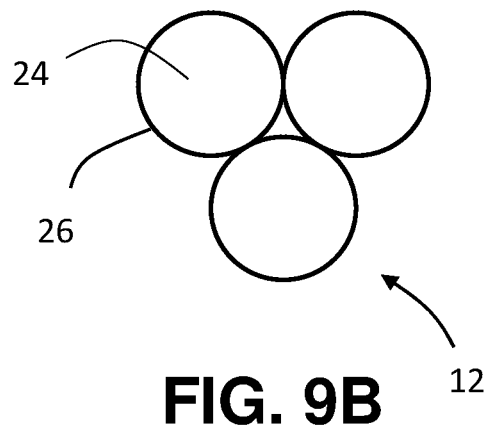
Figure 9C:
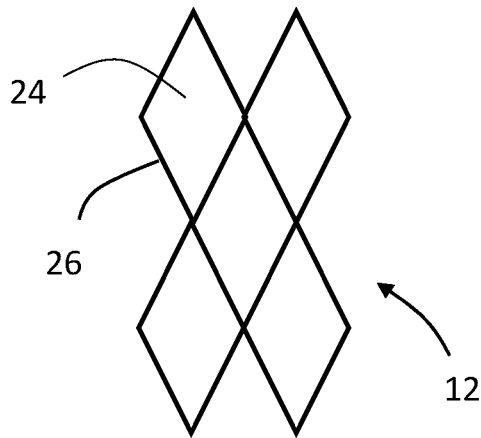
Figure 9D:
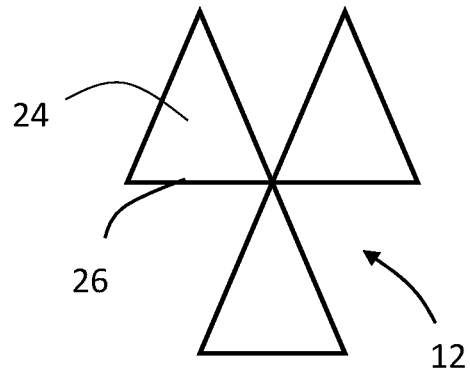
Figure 9E:
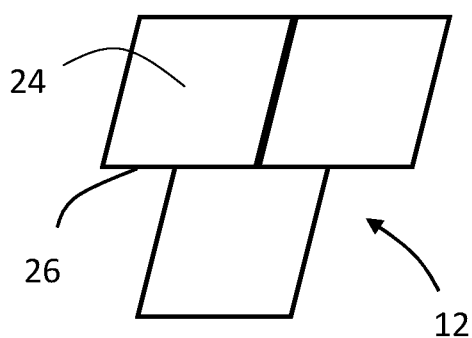
Figure 9F:
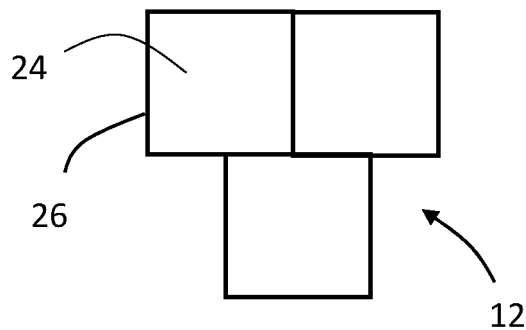

Finally, FIG. 8 shows the tool 100 in an open position after completing the forming process. The completed formed, sealed, and trimmed sandwich composite material component 10 ready to be removed from the tool 100 and used for its desired application without the need for additional processing steps.

The foregoing description is illustrative of particular embodiments of the invention but is not meant to be a limitation upon the practice thereof. The following claims, including all equivalents thereof, are intended to define the scope of the invention.

The invention claimed is:

1. A tool for manufacturing a sandwich composite material component, the tool comprising:
a lower tool having a surface configured to receive materials for forming the sandwich composite material component; and
an upper tool having a sealing edge and a cutting edge;
wherein the upper tool and the lower tool are configured to be separated to an open position and to be brought together to a closed position, the upper tool and the lower tool defining a cavity when in the closed position; and,
wherein the sealing edge extends farther from the upper tool than the cutting edge extends from the upper tool such that the sealing edge is configured to contact the materials for forming the sandwich composite before the cutting edge, and the sealing edge and the cutting edge extend around the entire perimeter of the cavity.

2. The tool of claim 1 wherein the surface configured to receive materials for forming the sandwich composite material is a planar surface.

3. The tool of claim 1 wherein the surface configured to receive materials for forming the sandwich composite material includes a protective barrier.

4. The tool of claim 1 wherein the lower tool includes at least one locator configured to indicate correct positioning of the materials for forming the sandwich composite material component relative to the surface of the lower tool.

5. The tool of claim 1 wherein the cutting edge is configured to trim excess material from the materials for forming the sandwich composite material component.

6. The tool of claim 1 wherein the upper tool and the lower tool apply a compressive force to the materials for forming the sandwich composite material component.

7. The tool of claim 1 wherein the upper tool and the lower tool apply heat to the materials for forming the sandwich composite material component.

8. The tool of claim 1 wherein the upper tool includes a shaped form configured to impart a shape to the materials for forming the sandwich composite material component.

9. The tool of claim 1 further comprising at least one applicator configured to apply a substance to the materials for forming the sandwich composite material component.

10. The tool of claim 1 further comprising at least one pin configured to be inserted into the cavity and through which a vacuum is applied to the materials for forming the sandwich composite material component inside the cavity.

11. The tool of claim 1 further comprising at least one injector configured to be inserted into the cavity and through which a substance is injected into the materials for forming the sandwich composite material component inside the cavity.

* * * * *